United States Patent [19]
Dixon

[11] 3,734,642
[45] May 22, 1973

[54] AERODYNAMIC BLADE ROOT END ATTACHMENT

[75] Inventor: Thomas P. Dixon, Stratford, Conn.

[73] Assignee: United Aircraft Corporation, East Hartford, Conn.

[22] Filed: June 29, 1971

[21] Appl. No.: 157,968

[52] U.S. Cl. ............ 416/61, 416/204, 416/239, 416/248
[51] Int. Cl. .............................. B63h 1/20
[58] Field of Search ............ 416/220, 230, 239, 416/248, 136, 226, 213 A, 204

[56] References Cited

UNITED STATES PATENTS

| 2,240,873 | 5/1971 | Thomas | 416/134 |
| 3,237,697 | 3/1966 | Ford et al. | 416/230 |
| 3,292,712 | 12/1966 | Schmidt | 416/239 |
| 3,303,889 | 2/1967 | Bates | 416/239 |
| 3,603,701 | 9/1971 | Tarcrynski | 416/230 X |

FOREIGN PATENTS OR APPLICATIONS

| 50,125 | 9/1939 | France | 416/221 |

*Primary Examiner*—Everette A. Powell, Jr.
*Attorney*—Vernon F. Hauschild

[57] ABSTRACT

The structural spar of an aerodynamic blade, preferably made of a composite material, is connected to the rotor hub through a primary connecting cuff to which the spar is bonded, and which normally constitutes the sole load path, and redundantly through a secondary cuff which is also bonded to the spar and which is normally unloaded and becomes loaded only upon failure of the bond between the spar and the primary cuff, which failure during operation causes position shifting of the spar and secondary cuff to thereby establish a malfunction warning vibration to the pilot.

25 Claims, 3 Drawing Figures

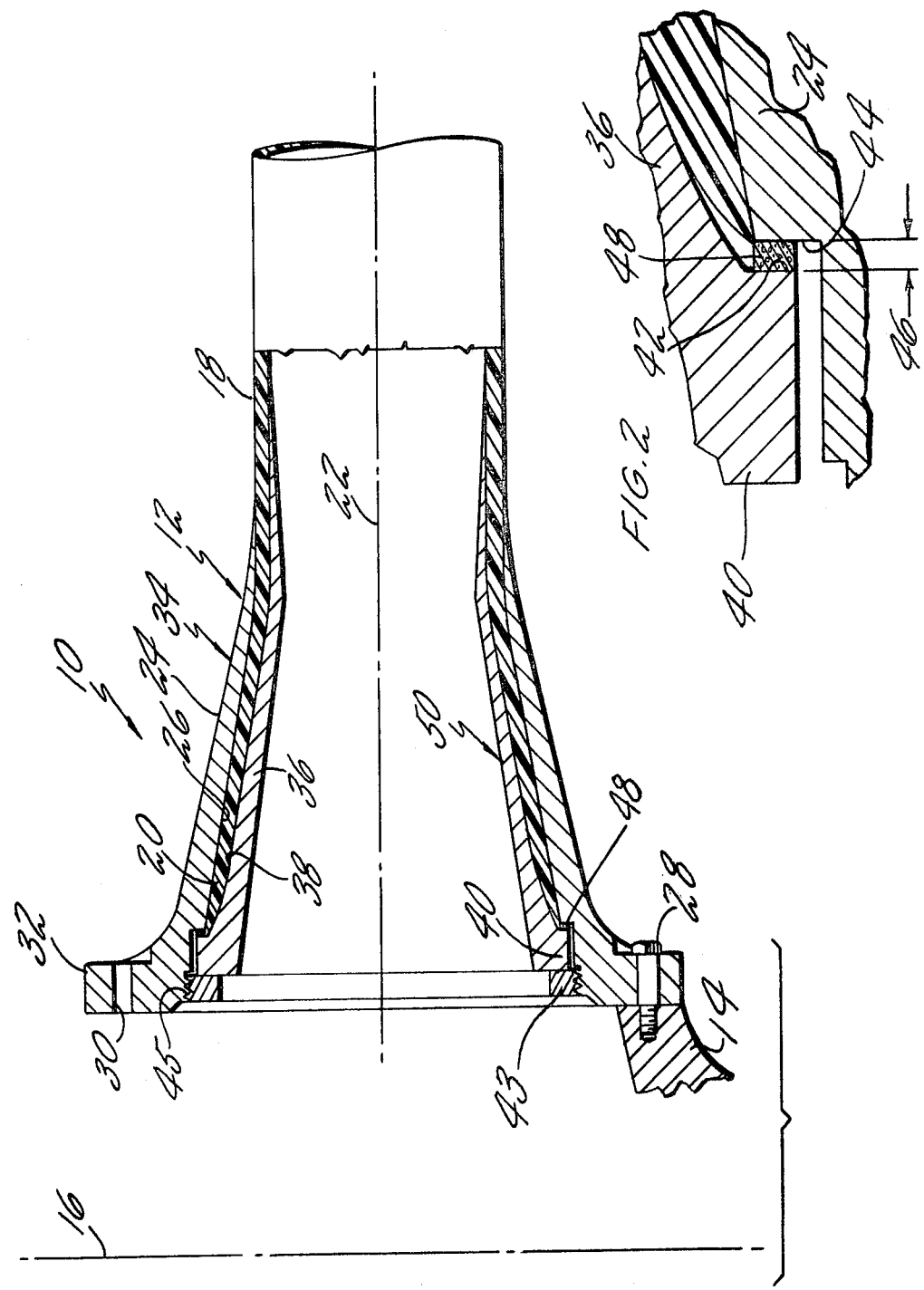

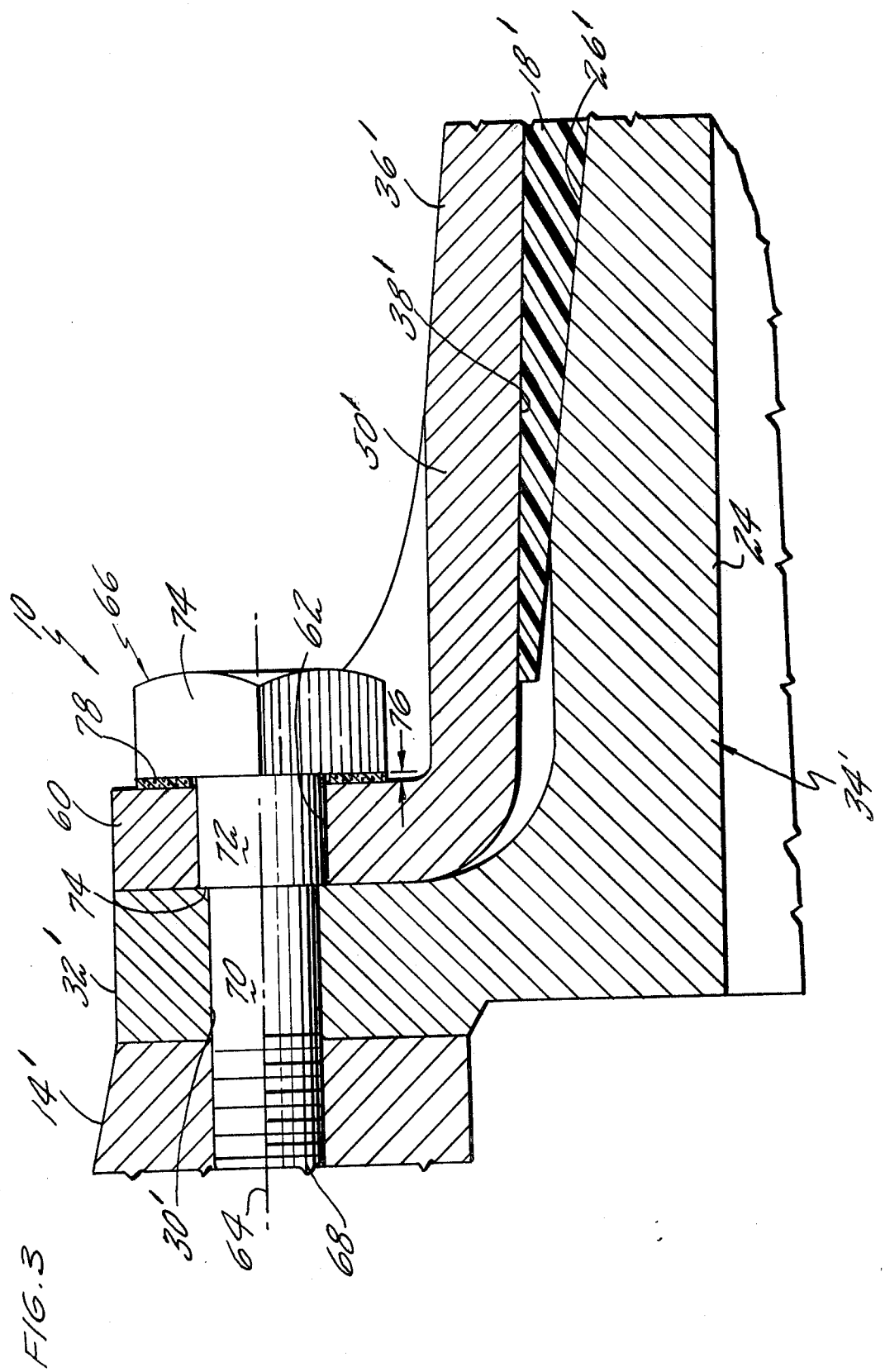

AERODYNAMIC BLADE ROOT END ATTACHMENT

BACKGROUND OF THE INVENTION

1. Field of Invention

This invention relates to apparatus for connecting the root end of an aerodynamic blade to the rotor of the propeller central hub for rotation therewith, along with other similar blades, about an axis of rotation and particularly to such attachment mechanism which is redundant in nature and which serves to warn the pilot of possible deterioration of the structural integrity of the blade retention mechanism.

2. Description of the Prior Art

It is conventional practice to connect aerodynamic blades to rotor hubs by bolting the root end of the blade spar to a blade cuff and connecting the cuff to the hub by stack bearings as shown in U.S. Pat. Nos. 3,428,132 and 3,369,611. When the blade or blade support spar is made of a composite material, such as boron fiber and epoxy, a metal cuff is bonded to the spar and the cuff flange then bolted to the rotor hub. This is required because the composite material cannot be bolted directly to the hub or other parts because, due to its fibrous nature, composite material has low shear strength at bolt holes. Accordingly, a rupture of the bonded connection between a composite blade or spar and the metallic cuff may progress so rapidly that adequate warning of impending blade failure could not be provided the pilot in order for him to land the aircraft. All known production warning systems concerning spar failure, such as the BIM indicators of U.S. Pat. Nos. 3,417,727 and 3,269,186, fail to provide a warning to the pilot of impending spar or spar connection failure during flight but serve to provide this warning only during inspection between flights.

SUMMARY OF INVENTION

A primary object of the present invention is to provide an improved connection between aerodynamic blade or structural spar and the rotor or propeller hub, to provide such a construction which is usable with blade structural spars made of composite material, and to provide such a construction which is redundant or fail-safe in nature and which serves to warn the pilot in flight of impending spar or blade failure.

In accordance with the present invention, the composite spar root end is connected by bonding to a primary cuff or sleeve and a secondary and coaxial sleeve so that blade loading is normally imparted from the blade to the hub through this primary sleeve, such that the secondary sleeve is normally unloaded and becomes loaded by blade centrifugal loading only when the bond between the primary sleeve and the spar fails. When such loading of the secondary sleeve occurs, radial movement of the spar and secondary sleeve will crush a low modulus or frangible washer to thereby shift the position of the spar or blade outwardly and establish a one per revolution vibration during flight to warn the pilot of possible deterioration of the structural integrity of the blade retention means.

In accordance with still a further aspect of the present invention, when the primary bond between the composite spar and the primary sleeve or cuff fails, the composite spar is still retained by the primary cuff due to the wedge or flared shape thereof such that centrifugal loading of the spar tends to wedge the spar into the primary sleeve or cuff, the spar being then attached to the blades through a secondary cuff, which is shiftable radially outwardly in response to blade centrifugal loading to establish a new blade position which will generate a one per revolution vibration warning to the pilot during flight.

BRIEF DESCRIPTION OF THE DRAWINGS

FIG. 1 is a cross-sectional showing of our preferred embodiment of the aerodynamic blade-to-rotor hub connection.

FIG. 2 is an enlarged showing of station 2 of FIG. 1.

FIG. 3 is a modification of this connection shown in enlarged cross section.

Referring to FIG. 1 we see helicopter rotor or aircraft rotor 10 which comprises a plurality of preferably identical blades 12 connected to hub attachment member 14 for rotation therewith about axis of rotation 16. Rotor 10 and hub 14 may be of the type disclosed in greater particularity in U.S. Pat. Nos. 2,925,130 and 3,097,701 and blade 12 may be of the type shown in U.S. Pat. No. 3,237,697. Blade 12 includes structural spar or blade support member 18 which is hollow at its hub-end 20 and which extends along the blade span and feathering axis 22. Primary sleeve or cuff 24 is sleeved over and envelops the hub-end 20 of spar 18 and is shaped to contact and define a substantial overlapping area 26 therewith. Spar 18 is bonded to primary sleeve 24 over this overlapping area 26. Primary sleeve 24 is bolted to hub attachment mechanism 14 by a plurality of bolts, such as 28, which extend through bolt holes 30 in the circumferential end flange 32 of sleeve 24. The bonded connection 26, primary sleeve 24 and bolts 28 serve to define a primary load carrying path 34 between spar 18 and hub attachment 14. Primary load carrying path 34 is the sole load carrying path during normal rotor operation. Secondary sleeve or cuff 36 is sleeved into the hollow interior of spar 18 at its hub-end 20 and is shaped to engage and define a substantial overlapping area 38 therewith. Sleeve 36 is bonded to spar 18 at area 38. Sleeve 36 includes radially extending flange 40 which defines radially extending shoulder 42 which, as best shown in FIG. 2, coacts with radially extending shoulder 44 on sleeve 24 to define gap 46 therebetween. Ring shaped washer or spacer 48, which has a low modulus of elasticity and is frangible or which may be a spring washer, is positioned in circumferential gap 46 and is unloaded during normal operation because the centrifugal loading of blade 12 passes from spar 18 through first load carrying path 34 to hub attachment 14. The use of the spacer or washer 48 is primarily to assure that gap 46 is maintained between the shoulders 42 and 44 when the secondary sleeve 36 is installed for bonding into the interior of spar 18. The force required to crush the spacer 48 must be greater than that required to achieve a structural bond at surface 38 under the pressure created on assembly by jack nut 43, which may be removed after curing of the bonded joint. A secondary purpose for the use of the spacer is to provide damping to the outward movement of the blade upon a failure of the primary bond. If damping were not present, the jolt of the sudden outward movement of the blade might cause a failure of the secondary bond. The soft metal spacer will extrude under the high impact loading. The bonded connection at 38, secondary sleeve or cuff 36, primary sleeve 24 and bolts 28 serve to form a redundant or secondary load path 50 between spar 18 and hub attachment 14, which secondary load path 50 is unloaded during normal operation and becomes loaded only when the bonded connection at 26 between spar 18 and sleeve 24 fails. Upon the failure of the primary bond at 26, the centrifugal loading of the blade 12 being carried by spar 18 is now imparted to secondary sleeve or cuff 36 through the bond connection at 38 and is of sufficient magnitude to crush frangible washer ring 48 to thereby simultaneously impart blade centrifugal loading to hub attachment 14 through primary sleeve 24 and bolts 28 and to also permit spar 18 and secondary sleeve 36 to shift radially outwardly from axis of rotation 16 to establish a new center of gravity for blade 12, thereby making the illustrated blade 12 different from the remaining rotor blades 12 of rotor 10 so as to establish a one per revolution vibration which will serve as a malfunction warning to the pilot while the aircraft is in flight.

Frangible washer 48 may be made of an elastomer, soft metal or honeycomb, and may be of a full or partial ring shape, such as a "C" shape.

Still viewing FIG. 1 it should be noted that spar 18 and sleeves 24 and 36 are flared outwardly at their hub ends so that, upon failure of the primary bond 26 between the spar 18 and the primary sleeve 24, the centrifugal loading of the blade will serve to wedge the spar into primary sleeve 24 and permit that sleeve to coact with secondary load path mechanism 50 to support the blade from the hub. It will accordingly be noted that in the FIG. 1 construction, and in the FIG. 3 construction to be described hereinafter, composite spar 18, which may be made of epoxy bonded boron fibers or other conventional composite structures, is structurally bonded by an adhesive, such as an epoxy or modification thereof, to metallic sleeves 24 and 36, which are preferably fabricated of titanium. These metal sleeves are in turn bolt connected to the hub, thereby avoiding bolt connections between the composite material and the hub.

Referring to FIG. 3 we see a modification of my blade retention means which differs from FIG. 1 modification in that the primary sleeve or cuff 24' is sleeved into the interior of the spar 18' and the secondary or redundant sleeve or cuff 36' envelops and is sleeved over spar 18'. Each sleeve 24' and 36' is bonded to the 18' spar at primary bond 26' and secondary bond 38', respectively. Primary sleeve 24' includes circumferential end flange 32' having a plurality of circumferentially positioned bolt holes 30' extending therethrough. Secondary sleeve 36' has a circumferential end flange 60 which abuts end flange 32' and which includes a plurality of circumferentially oriented and larger diameter bolt holes 62 therein, with bolt holes 30' and 62 being aligned and concentric about bolt axis 64. Bolt 66 threadably engages rotor hub attachment 14' at threaded connection 68 and includes cylindrical shank section 70, which snugly engages bolt hole 30', a larger cylindrical shank section 72, which snugly engages bolt hole 62, and a shoulder 74 which abuts end flange 32'. Bolt member 66 also includes head section 75 which, when shoulder 74 abuts flange 32', defines gap 76 with flange 60 so that spacer 78, which is preferably a washer ring with a low modulus of elasticity and hence being frangible, is positioned within space or gap 76.

In the FIG. 3 modification, the primary load carrying path defining mechanism 34' between spar 18' and hub attachment 14', comprises primary bond connection 26', primary sleeve 24' and bolts 66, while secondary load carrying path defining mechanism 50' comprises bonded connection 38', secondary sleeve 36', frangible washers 78 and bolts 66. Again, as in the FIG. 1 connection, the gap 76 is provided such that primary load carrying path defining mechanism 34' is the sole load carrying path during normal operation, and the redundant or secondary load carrying path defining mechanism 50' comes into play only after failure of the bonded connection at 26'. Upon this failure at 26', the blade centrifugal loading is then passed from spar 18' to secondary sleeve 36' and the magnitude of this centrifugal loading is sufficient to cause spar 18' and sleeve 36' to shift radially outward, thereby crushing frangible spacers 78 so that end flange 60 abuts bolt heads 75 to impart the centrifugal loading of the blade to hub attachment 14' through bolts 66. At the same time, this radially outward shifting of spar 18' and sleeve 36' serves to change the location of the center of gravity of this malfunctioned blade and make it different from the center of gravity of the other blades of the rotor system 10' with which it was initially in balance, thereby establishing a one per revolution vibration in rotor 10' to serve as a malfunction warning to the pilot.

It will accordingly be noted that in both the FIG. 1 and FIG. 3 constructions, redundant load paths are established between the spar and the hub attachment utilizing construction which avoids a bolt connection in composite material and which provides an in-flight warning signal to the pilot of possible deterioration of the structural integrity of the blade retention means.

It will also be noted that my invention is applicable as a fail-safe and warning attachment regardless of the material of the basic blade and spar, and for instances of failure pertinent to the blade cuff or sleeve rather than separation of spar from sleeve at the bond attachment point. Should a failure occur in sleeve 24 or 24', the same effect as described heretofore will occur. Namely, the load path will shift to the secondary sleeve and through the bolts to the hub attachment 14 or 14'.

I wish it to be understood that I don not desire to be limited to the exact details of construction shown and described, for obvious modifications will occur to a person skilled in the art.

I claim:

1. An aeronautical blade adapted to be do to a hub for rotation therewith about an axis along with at least one other similar blade including:
   A. a spar member extending along the blade span and being hollow at the hub attachment end thereof,
   B. a first sleeve member in sleeved relationship to said spar and shaped to develop substantial overlapping and abutting area therewith and bonded thereto,
   C. means to connect the first sleeve member to the hub so that during normal operation centrifugal loading from said spar is passed through said first sleeve member and then to said hub attachment,
   D. a second sleeve member on the opposite side of said spar from said first sleeve member and in sleeve relationship with said spar and shaped to develop substantial overlapping and abutting area therewith and originally positioned and bonded thereto, and
   E. means including a frangible member to connect the second sleeve member to the hub so that the second sleeve is normally unloaded and so that when the bond between the spar and the first sleeve member fails, the centrifugal loading of the spar is taken through the second member, thereby crushing said frangible member to permit said spar and second member to move from their original positions to produce warning vibrations during rotation.

2. Apparatus according to claim 1 wherein said frangible member is a washer.

3. Apparatus according to claim 1 wherein said spar and said first and second sleeves are flared adjacent their hub attachment ends.

4. Apparatus according to claim 3 wherein said spar is made of composite material and said sleeves are made of titanium.

5. Apparatus according to claim 3 wherein said first sleeve member is sleeved over said spar at the hub-end thereof and wherein said second sleeve member is sleeved into said spar at the hub attachment end thereof so that if said bond between said first sleeve and said spar fails, centrifugal force acting on said spar and said second sleeve will serve to wedge said spar flared end into said flared first sleeve member.

6. Apparatus according to claim 5 wherein said sleeves include overlapping shoulders positioned to define a selectively dimensioned gap therebetween, a frangible spacer located in said gap and sized so as to be unloaded during normal operation and so as to be crushed therebetween when the bond between said spar and said first sleeve fails thereby permitting said spar and said second sleeve to move under the influence of centrifugal force in a direction to close the gap between said overlapping shoulders.

7. Apparatus according to claim 2 wherein said first sleeve member is sleeved into said spar member at the hub attachment end thereof and wherein said second sleeve member is sleeved over said spar member at the hub attachment end thereof and wherein said sleeve members include abutting flanges having aligned bolt holes therein and wherein said connecting means for said first and second members include at least one bolt member adapted to threadably engage the hub attachment and pass through the first member bolt hole and including a stepped shoulder to abut the first member flange and thereby secure the first member flange to the hub attachment, while said second member bolt hole envelops the shoulder portion of the bolt member, and further including a bolt head spaced from said second member flange during normal operation to define a gap therebetween, and wherein said frangible washer is located in said gap and sized to be normally unloaded when the bond between said spar and first sleeve member is operable and to be crushed when the bond between said first sleeve and said spar fails, thereby placing the second sleeve member under the influence of spar centrifugal loading to cause said second sleeve member and spar to move to close said gap and establish new blade aerodynamic characteristics to thereby produce a warning vibration.

8. An aeronautical blade for use in a plural bladed rotor or propeller wherein substantially identical blades are attached to and rotate with a central hub and blade attachments including:

A. a spar member extending radially outward from the hub axis of rotation along the blade span and having a hollow interior adjacent the hub attachment, B. a primary load carrying sleeve shaped to engage one wall surface of the spar and being bonded thereto as part of a first load path between the spar and the hub, C. means for connecting said primary sleeve to the hub, D. a secondary load carrying sleeve shaped to engage the other wall surface of said spar and positioned and bonded thereto so as to be normally unloaded and to form part of a secondary load carrying path between said spar and said hub, which secondary load carrying path further includes:

1. means connecting said secondary sleeve to said hub attachment and including:

a. a frangible spacer sized and positioned to be unloaded when said spar-primary sleeve joint is operable and to be crushed when said spar-primary sleeve joint fails so that the spar centrifugal load is passed to said hub attachment through said secondary sleeve and spacer, which spacer crushing permits centrifugal force to shift the position of said spar and secondary sleeve to establish warning vibrations.

9. An aeronautical blade adapted to be connected to a hub attachment for rotation therewith along with at least one other similar blade including:

A. a spar member extending along the blade span and being hollow at the inner end thereof adjacent the hub attachment, B. a first normally operative load carrying mechanism connecting said spar to the hub attachment including:

1. a first member connected to said spar and adapted to be connected to the hub attachment, C. a second normally inoperative load carrying mechanism connecting said spar to the hub attachment and including:

1. a second member connected to said spar and adapted to be connected to the hub attachment, 2. means connecting said second member to the hub attachment including a frangible member sized and positioned to be normally unloaded and to be crushed when the connection between the first member and the spar fails, thereby imparting the spar centrifugal load to the hub attachment through said second load carrying mechanism to thereby permit the spar member to shift position and establish a one per revolution malfunction warning vibration.

10. Apparatus according to claim 9 wherein said frangible member is a washer.

11. Apparatus according to claim 9 wherein said spar and said first and second members are flared adjacent their hub attachment ends.

12. Apparatus according to claim 9 wherein said spar is made of composite material and said members are made of titanium.

13. Apparatus according to claim 11 wherein said first member envelops said spar member at the hub attachment end thereof and wherein said second member is positioned in said spar at the hub attachment end thereof so that when said bond between said first member and said spar fails, centrifugal force acting on said spar and said second member will serve to wedge said spar flared end into said flared first member.

14. Apparatus according to claim 13 wherein said members include overlapping shoulders positioned to define a selectively dimensioned gap therebetween, a frangible spacer located in said gap and sized so as to be unloaded during normal operation and so as to be crushed between said shoulders when the bond between said spar and said first member fails thereby permitting said spar and said second member to move under the influence of centrifugal force in a direction to close the gap between said overlapping shoulders.

15. Apparatus according to claim 13 and including means to control the dimension of the gap.

16. Apparatus according to claim 14 and including a jack nut threadably engaging first member and actuatable to bear against said second member to control the gap between the overlapping flanges of said first and second members.

17. Apparatus according to claim 10 wherein said first member is positioned in said spar member at the hub attachment end thereof and wherein said second member envelops said spar member at the hub attachment end thereof and wherein said first and second members include abutting flanges having aligned bolt holes therein and wherein said connecting means for said first and second members includes at least one bolt member adapted to threadably engage the hub attachment and pass through the first member bolt hole and including a stepped shoulder to abut the first member flange and thereby secure the first member flange to the hub attachment, while said second member bolt hole envelops a shoulder portion of the bolt member, and further including a bolt head spaced from said second member flange during normal operation to define a gap therebetween, and wherein said frangible washer is located in said gap and sized to be normally unloaded when the bond between said spar and first member is operable and to be crushed when the bond between said first member and said spar member fails, thereby placing the second member under the influence of spar member centrifugal loading to cause said second member and spar to move to close said gap and establish new blade aerodynamic characteristics to thereby produce a warning vibration.

18. An aeronautical blade adapted to be connected to a central hub attachment and rotate therewith as part of a rotor mechanism about an axis of rotation including:
   A. a blade support member,
   B. first means for connecting the blade support member to the hub attachment so as to normally carry blade centrifugal loading to the hub, and
   C. second means for connecting said blade support member to the hub attachment so as to be normally unloaded when said first connecting means is operative and so as to be shiftable in position under the influence of blade centrifugal loading when said first connecting means has failed to thereby establish a warning malfunction vibration during blade rotation.

19. Apparatus according to claim 18 wherein said second means includes a normally unloaded frangible member which is crushed when the other portions of said second means are placed under the influence of blade centrifugal loading when said first connecting means has failed, thereby permitting at least some of the other portions of said second means to shift position.

20. Apparatus according to claim 19 wherein said frangible member is at least one ring.

21. Apparatus according to claim 18 wherein said first and second connecting means cooperate to define two shoulder members selectively positioned to establish a gap therebetween, and a frangible member positioned in said gap so that the shoulder member of said second means is normally unloaded when said first connecting means is operative and is shiftable in position under the influence of blade centrifugal loading to close said gap and crush said frangible member when said first connecting means has failed to thereby establish a warning malfunction vibration during blade rotation.

22. Apparatus according to claim 18 wherein said second means includes gap defining members and wherein the shiftability thereof is caused by said gap defining members moving toward each other.

23. An aeronautical blade adapted to be connected to a hub for rotation therewith about an axis along with at least one other similar blade including:
   A. a spar member extending along the blade span and being hollow at the hub attachment end thereof to define inner and outer wall surfaces,
   B. a first sleeve member in sleeved relationship to one of said wall surfaces of said spar and shaped to develop substantial overlapping and abutting area therewith and bonded thereto,
   C. means to connect the first sleeve member to the hub so that during normal operation centrifugal loading from said spar is passed through said first sleeve member and then to said hub attachment,
   D. a second sleeve member on the opposite side of said spar from said first sleeve member and shaped to develop substantial overlapping and abutting area with the other spar wall surface and originally positioned and bonded thereto, and
   E. means including gap defining members connecting the second sleeve member to the hub so that the second sleeve is normally unloaded and so that when the bond between the spar and the first sleeve member fails, the centrifugal loading of the spar is taken through the second member, thereby causing said gap defining members to move toward one another and said spar and second member to move from their original positions to produce warning vibrations during rotation.

24. An aeronautical blade adapted to be connected to a hub for rotation therewith about an axis along with at least one other similar blade including:
   A. a spar member extending along the blade span and being hollow at the hub attachment end thereof to define inner and outer wall surfaces,
   B. a first sleeve member in sleeved relationship to one of said wall surfaces of said spar and connected thereto,
   C. means to connect the first sleeve member to the hub so that during normal operation centrifugal loading from said spar is passed through said first sleeve member and then to said hub attachment,
   D. a second sleeve member on the opposite side of said spar from said first sleeve member and connected to the other wall surface thereof, and
   E. means including a frangible member to connect the second sleeve member to the hub so that the second sleeve is normally unloaded and so that the connection between the spar and the first sleeve member fails, the centrifugal loading of the spar is taken through the second member, thereby crushing said frangible member to permit said spar and second member to move from their original positions to produce warning vibrations during rotation.

25. An aeronautical blade adapted to be connected to a hub for rotation therewith about an axis along with at least one other similar blade including:
A. a spar member extending along the blade span and being hollow at the hub attachment end thereof,
B. a first sleeve member sleeved into or over said spar and connected thereto,
C. means to connect the first sleeve member to the hub so that during normal operation centrifugal loading from said spar is passed through said first sleeve member and then to said hub attachment,
D. a second sleeve member on the opposite side of said spar from said first sleeve member and connected thereto,
E. means including gap defining members connecting the second sleeve member to the hub so that the second sleeve is normally unloaded and so that when the bond between the spar and the first sleeve member fails, the centrifugal loading of the spar is taken through the second member, thereby causing said gap defining members to move toward one another and said spar and second member to move from their original positions to produce warning vibrations during rotation.

* * * * *